(12) United States Patent
Ogawa et al.

(10) Patent No.: US 11,493,477 B2
(45) Date of Patent: Nov. 8, 2022

(54) ELECTROPHORESIS METHOD, ELECTROPHORESIS SYSTEM, AND ELECTROPHORESIS GEL

(71) Applicant: HITACHI HIGH-TECH CORPORATION, Tokyo (JP)

(72) Inventors: Mima Ogawa, Tokyo (JP); Takahide Yokoi, Tokyo (JP); Chihiro Uematsu, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 114 days.

(21) Appl. No.: 16/973,461

(22) PCT Filed: May 28, 2019

(86) PCT No.: PCT/JP2019/021161
§ 371 (c)(1),
(2) Date: Dec. 9, 2020

(87) PCT Pub. No.: WO2020/012805
PCT Pub. Date: Jan. 16, 2020

(65) Prior Publication Data
US 2021/0247358 A1    Aug. 12, 2021

(30) Foreign Application Priority Data

Jul. 12, 2018  (JP) .............................. JP2018-132169

(51) Int. Cl.
*G01N 27/447*    (2006.01)
(52) U.S. Cl.
CPC . *G01N 27/44743* (2013.01); *G01N 27/44782* (2013.01)
(58) Field of Classification Search
CPC .................. G01N 27/44743; G01N 27/44782
See application file for complete search history.

(56) References Cited

U.S. PATENT DOCUMENTS

| 2005/0009039 | A1* | 1/2005 | Jagota ................... B82Y 10/00 |
| | | | 536/25.4 |
| 2008/0057557 | A1 | 3/2008 | Margalit |
| 2009/0308749 | A1* | 12/2009 | Park ................. G01N 27/44704 |
| | | | 204/456 |

FOREIGN PATENT DOCUMENTS

| JP | 2004-290109 A | 10/2004 |
| JP | 2010-502962 A | 1/2010 |

OTHER PUBLICATIONS

International Search Report, PCT/JP2019/021161, dated Aug. 27, 2019, 1 pg.

* cited by examiner

*Primary Examiner* — Luan V Van
*Assistant Examiner* — Caitlyn Mingyun Sun
(74) *Attorney, Agent, or Firm* — Volpe Koenig

(57) ABSTRACT

An electrophoresis method, system, and gel recover biological substances from the gel with high efficiency. The method uses an electrophoresis gel having an injection hole into which biological substances are injected and a recovery hole from which the biological substances are recovered. The electrophoresis method includes injecting the biological substances into the injection hole, and applying an electric field penetrating the injection and recovery holes. A vertical axis in a downward direction as a positive direction is set as an X-axis, an axis which is perpendicular to the X-axis is set as a Y-axis, and coordinates of a bottom of the recovery hole are set as ($X_C$, $Y_C$). The X coordinate $X_C$ of the bottom of the recovery hole satisfies $X_C > X_1$ when the biological substance is electrophoresed to coordinates ($X_1$, $Y_C$) in the recovery hole from a bottom of the injection hole in the applying the electric field.

4 Claims, 5 Drawing Sheets

A—A CROSS-SECTIONAL VIEW

B—B CROSS-SECTIONAL VIEW

ELECTROPHORESIS METHOD, ELECTROPHORESIS SYSTEM, AND ELECTROPHORESIS GEL

TECHNICAL FIELD

The present invention relates to an electrophoresis method, an electrophoresis system, and an electrophoresis gel.

BACKGROUND ART

A gel electrophoresis method is a method for analyzing biological substances such as nucleic acids or proteins by using a phenomenon that when an electric field is applied to a charged substance, the substance moves toward an electrode having an opposite polarity. In general, an electrophoresis gel such as an agarose gel or an acrylamide gel is used as a support for the biological substance. Since a moving speed in the electrophoresis gel differs depending on molecular weights of the biological substances, the biological substances are separated as different bands for the molecular weights. Since the gel electrophoresis method has a high resolution regarding the separation of the biological substances, the gel electrophoresis method is also adopted for separating and recovering biological substances having a target molecular weight from biological substances having different molecular weights.

A method for cutting a target band of the electrophoresis gel separated by electrophoresis together with surrounding electrophoresis gels and recovering the biological substances from the cut electrophoresis gels is generally adopted as a method for recovering the biological substances having the target molecular weight. However, when the biological substances are recovered from the cut electrophoresis gel, there are problems that a concentration of the biological substances is changed and an extra cutting step is required.

PTL 1 and PTL 2 disclose that a recovery hole of the biological substances is provided in the electrophoresis gel in advance as the method for simultaneously recovering the target biological substances together with the electrophoresis without cutting the electrophoresis gel.

CITATION LIST

Patent Literature

PTL 1: JP 2004-290109 A
PTL 2: JP 2010-502962 A

SUMMARY OF INVENTION

Technical Problem

However, in the method described in PTL 1 and PTL 2, there is a problem that a part of the biological substances does not enter the recovery hole and recovery efficiency is lowered.

Therefore, the present invention provides an electrophoresis method, an electrophoresis system, and an electrophoresis gel for recovering biological substances from an electrophoresis gel with high recovery efficiency.

Solution to Problem

In order to solve the aforementioned problems, a representative electrophoresis method of the present invention is an electrophoresis method using an electrophoresis gel that has an injection hole into which biological substances are injected and a recovery hole from which the biological substances are recovered.

The electrophoresis method includes injecting the biological substances into the injection hole, and applying an electric field penetrating the injection hole and the recovery hole. An axis having a vertical downward direction as a positive direction is set as an X-axis, an axis which is parallel to a plane passing through any points of the injection hole and the recovery hole and is perpendicular to the X-axis is set as a Y-axis, and coordinates of a bottom of the recovery hole are set as $(X_C, Y_C)$, and the X coordinate $X_C$ of the bottom of the recovery hole satisfies the following Expression (1) when the biological substance is electrophoresed to coordinates $(X_1, Y_C)$ in the recovery hole from a bottom of the injection hole in the step of applying the electric field.

[Expression 1]

$$X_C > X_1 \tag{1}$$

A representative electrophoresis system of the present invention is an electrophoresis system including an electrophoresis gel and an electrophoresis apparatus. The electrophoresis gel has an injection hole into which biological substances are injected, and a recovery hole from which the biological substances are recovered. The electrophoresis apparatus includes a controller that applies an electric field penetrating the injection hole and the recovery hole. An axis having a vertical downward direction as a positive direction is set as an X-axis, an axis which is parallel to a plane passing through any points of the injection hole and the recovery hole and is perpendicular to the X-axis is set as a Y-axis, and coordinates of a bottom of the recovery hole are set as $(X_C, Y_C)$, and the X coordinate $X_C$ of the bottom of the recovery hole satisfies the following Expression (1) when the biological substance is electrophoresed to coordinates $(X_1, Y_C)$ in the recovery hole from a bottom of the injection hole by the application of the electric field.

[Expression 1]

$$X_C > X_1 \tag{1}$$

A representative electrophoresis gel of the present invention includes an injection hole into which biological substances are injected, and a recovery hole from which the biological substances are recovered, wherein the recovery hole is deeper than the injection hole.

Advantageous Effects of Invention

According to the present invention, the biological substances can be recovered from the electrophoresis gel with high recovery efficiency.

Other objects, configurations, and effects will be made apparent in the following descriptions.

DESCRIPTION OF EMBODIMENTS

Figure 1:
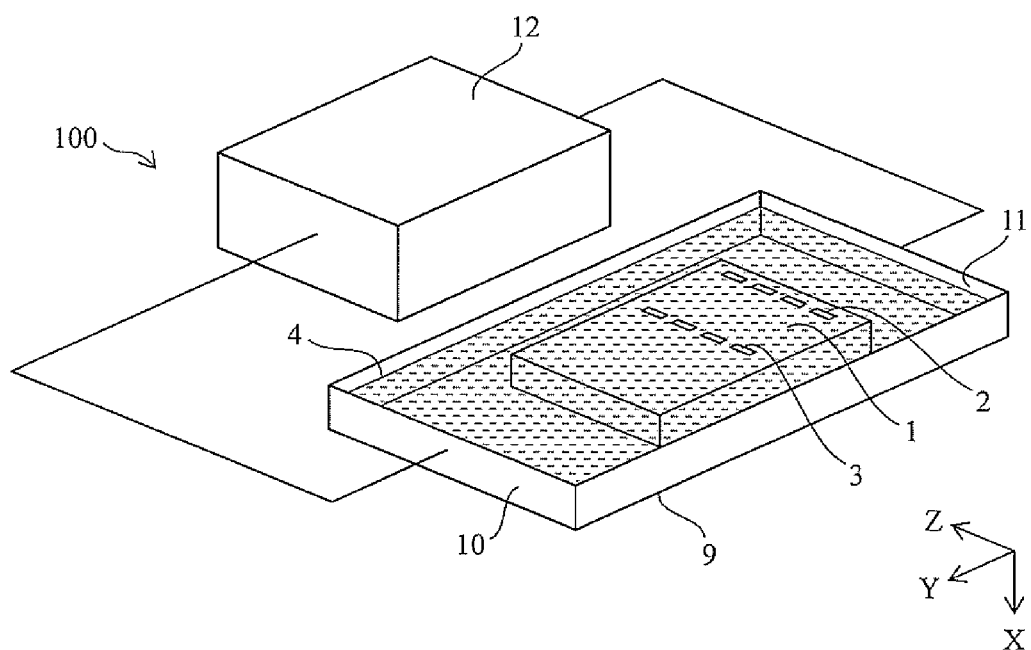
FIG. 1 is a schematic perspective view illustrating an electrophoresis system according to a first embodiment.

In all the drawings for describing the embodiments, components having the same function are denoted by the same reference signs, and redundant description thereof will be omitted as far as possible. The present invention is not interpreted as being limited to the description contents of the embodiments to be illustrated below. It is easily understood by those skilled in the art that the specific configuration can be changed without departing from the idea or the spirit of the present invention.

Positions, sizes, shapes, and ranges of components illustrated in the drawings may not necessarily represent actual positions, sizes, shapes, and ranges in order to facilitate understanding of the invention. Thus, the present invention is not necessarily limited to the positions, sizes, shapes, and ranges disclosed in the drawings.

In the present specification, a component represented in the singular includes the plural unless the context clearly indicates otherwise.

In the present specification, an XYZ Cartesian coordinate system is set, a vertical direction is set as an X-axis, and a plane perpendicular to the X-axis is set as a YZ plane. The X-axis has a positive direction in a vertical downward direction. Hereinafter, a vertical downward direction may be referred to as downward, and a vertical upward direction may be referred to as upward.

First Embodiment

Figure 2:
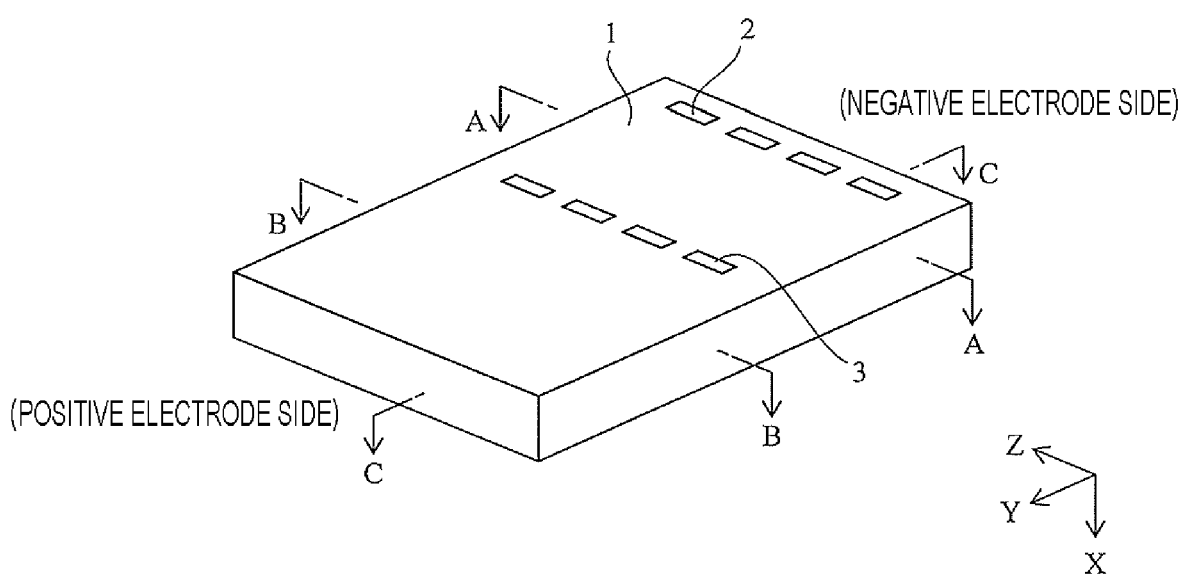
FIG. 2 is a schematic perspective view illustrating an electrophoresis gel used in the electrophoresis system.

An electrophoresis system according to a first embodiment will be described with reference to FIGS. 1 and 2. FIG. 1 is a schematic perspective view illustrating the electrophoresis system according to the first embodiment. FIG. 2 is a schematic perspective view illustrating an electrophoresis gel used in the electrophoresis system.

As illustrated in FIG. 1, the electrophoresis system according to the first embodiment includes an electrophoresis gel 1 and an electrophoresis apparatus 100.

The electrophoresis apparatus 100 includes an electrophoresis tank 9, a positive electrode 10, a negative electrode 11, and a voltage controller 12 (controller). The electrophoresis tank 9 houses the electrophoresis gel 1, a buffer solution 4, the positive electrode 10, and the negative electrode 11.

The positive electrode 10 and the negative electrode 11 are immersed in the buffer solution 4 within the electrophoresis tank 9. As illustrated in FIG. 1, the positive electrode 10 and the negative electrode 11 are arranged on, for example, inner wall surfaces of the electrophoresis tank 9 facing each other in a Y-axis direction.

The voltage controller 12 controls a voltage to be applied to the positive electrode 10 and the negative electrode 11. The voltage is applied to the positive electrode 10 and the negative electrode 11, and thus, an electric field is generated from the positive electrode 10 to the negative electrode 11 within the electrophoresis tank 9. That is, the electric field is directed from a positive direction of a Y-axis to a negative direction. In the present embodiment, the electric field is described as being uniformly distributed in a space, but the distribution is not limited. The electric field to be applied into the electrophoresis tank 9 may be linear or curved as long as the electric field is directed from the positive electrode 10 to the negative electrode 11.

Hereinafter, a case where biological substances are nucleic acids will be described as an example. Since the nucleic acid is negatively charged, a direction of electrophoresis is opposite to a direction of the electric field, and the nucleic acids are electrophoresed from the negative electrode 11 side to the positive electrode 10 side. When positively charged biological substances are used, a direction of the electrophoresis gel 1 is reversed, or the arrangement of the positive electrode 10 and the negative electrode 11 is reversed.

The electrophoresis gel 1 is immersed in the buffer solution 4 within the electrophoresis tank 9. Examples of the electrophoresis gel 1 can include a known gel such as an agarose gel or a polyacrylamide gel. A thickness of the electrophoresis gel 1 is not particularly limited, but is preferably 2 to 10 mm from the viewpoint that a band of the biological substances obtained by the electrophoresis is sharp and easy to be recognized. The thickness of the electrophoresis gel 1 may not be constant. In FIGS. 1 and 2, the electrophoresis gel 1 is a substantially rectangular parallelepiped, but a shape thereof is not limited.

As illustrated in FIGS. 1 and 2, the electrophoresis gel 1 has injection holes 2 and recovery holes 3. In FIGS. 1 and 2, in the electrophoresis gel 1, four injection holes 2 and four recovery holes 3 are arranged in a Z-axis direction, but the number of holes is not limited.

The electrophoresis gel 1 can be separated so as to obtain divided flow paths such that a region having one injection hole 2 and one recovery hole 3 adjacent to each other in the Y-axis direction configures one flow path, and the separated electrophoresis gel can be respectively housed in chambers (not illustrated) of the electrophoresis tank 9.

The injection holes 2 are holes for injecting a mixture of biological substances having various molecular weights. The injection holes 2 are preferably provided at an end of the electrophoresis gel 1 in the Y-axis direction. The biological substances are injected into the injection hole 2 as an injection solution mixed with a liquid having a specific gravity higher than that of the buffer solution 4. Examples of the liquid with which the biological substances are mixed include glycerol and aqueous solution of sugar. A concentration of the glycerol in the injection solution can be, for example, 6%. A viscosity of the injection solution can be, for example, 1 mPa·s.

The recovery holes 3 are holes for recovering the biological substances having a target molecular weight. A distance between the injection hole 2 and the recovery hole 3 in the Y-axis direction can be optionally set, but the recovery hole 3 is preferably provided near a position at which the biological substances having a target molecular weight appears as the band.

The electrophoresis gel 1 in which the injection holes 2 are positioned on the negative electrode 11 side and the recovery holes 3 are positioned on the positive electrode 10 side is arranged within the electrophoresis tank 9 such that the electric field acting in the Y-axis direction penetrates the injection holes 2 and the recovery holes 3. In other words, the Y-axis is an axis that is parallel to a plane passing through any one point of the injection hole 2 and any one point of the recovery hole 3 and is orthogonal to the X-axis. The electrophoresis gel 1 which is a substantially rectangular parallelepiped is preferably arranged such that sides are along the XYZ axes, respectively.

In the present embodiment, the injection hole 2 and the recovery hole 3 are substantially rectangular parallelepipeds, but the shapes and sizes thereof are not limited. The sizes of the injection hole 2 and the recovery hole 3 in the YZ plane can be optionally set. In FIGS. 1 and 2, dimensions of the injection hole 2 and the recovery hole 3 in the YZ plane are equal, but may be different. However, the injection hole 2 and the recovery hole 3 do not preferably penetrate the electrophoresis gel 1 in the X-axis direction. Depths of the injection hole 2 and the recovery hole 3 will be described later.

Examples of a method of forming the injection holes 2 and the recovery holes 3 include a method of inserting a comb before solidifying the electrophoresis gel 1, a method of forming the injection holes 2 and the recovery holes 3 by cutting the solidified electrophoresis gel 1, and a method of forming the injection holes 2 and the recovery holes 3 by melting the solidified electrophoresis gel 1 through heating, but the method of forming these holes is not particularly limited.

Next, an electrophoresis method in the electrophoresis system according to the first embodiment will be described with reference to FIG. 3.

The electrophoresis method according to the present embodiment includes a step of injecting, by a user, the biological substances into the injection holes 2 of the electrophoresis gel 1, and a step of performing, by the voltage controller 12, the electrophoresis by applying the electric field penetrating the injection holes 2 and the recovery holes 3.

Figure 3:
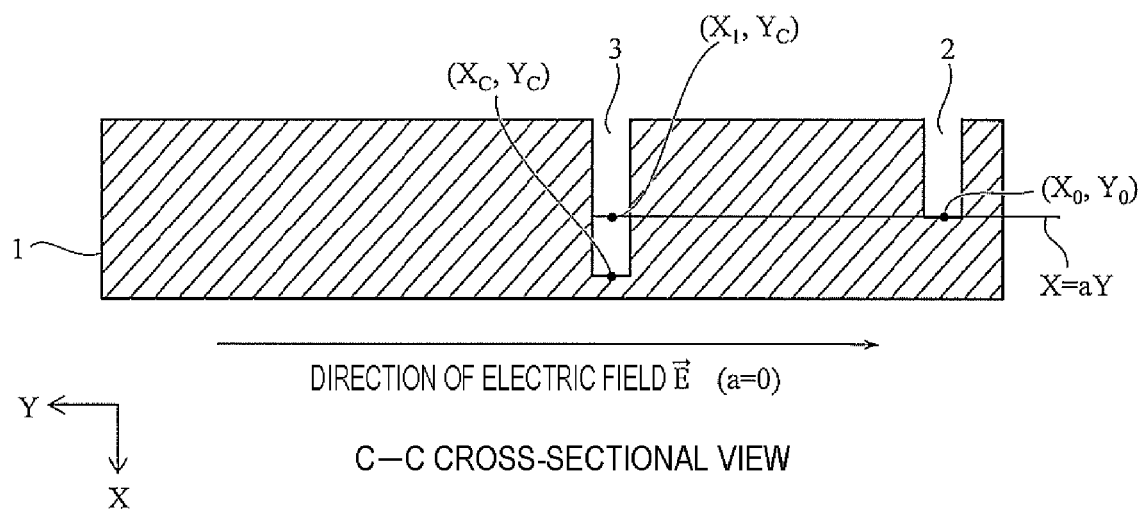
FIG. 3 is a cross-sectional view of an electrophoresis gel 1 according to the first embodiment taken along a line C-C of FIG. 2.

FIG. 3 is a C-C cross-sectional view of the electrophoresis gel 1 according to the first embodiment. As illustrated in FIG. 3, in the electrophoresis gel 1 according to the first embodiment, the recovery hole 3 is formed deeper than the injection hole 2. In general, in a gel electrophoresis system, the biological substances are mixed with the liquid having the specific gravity higher than that of the buffer solution 4, and are injected into the injection holes 2. Accordingly, at the start of the electrophoresis, the biological substance positioned at the lowermost position in the vertical direction is basically positioned at the bottom of the injection hole 2. Here, as illustrated in FIG. 3, among the biological substances present in the injection hole 2 at the start of the electrophoresis, coordinates of the biological substance having the largest X coordinate, that is, the bottom of the injection hole 2 is used as an origin, and these coordinates are $(X_0, Y_0)$. Coordinates of the bottom of the recovery hole 3 are $(X_C, Y_C)$.

The coordinates $(X_0, Y_0)$ of the bottom of the injection hole 2 are, for example, a center of the bottom of the injection hole 2 in the YZ plane. The coordinates $(X_C, Y_C)$ of the bottom of the recovery hole 3 are, for example, a center of the bottom of the recovery hole 3 in the YZ plane. The position of the coordinates $(X_0, Y_0)$ of the bottom of the injection hole 2 and the position of the coordinates $(X_C, Y_C)$ of the bottom of the recovery hole 3 are not limited to the centers in the YZ plane, but can be any positions in the YZ plane.

When the biological substance positioned at the bottom $(X_0, Y_0)$ of the injection hole 2 at the start of the electrophoresis receives the electric field and is electrophoresed up to the Y coordinate $Y=Y_C$ of the recovery hole 3, it can be assumed that a position (X coordinate) in the vertical direction is $X=X_1$ ($X_1=X_0$) from the direction of the electric field. That is, it can be assumed that the biological substance positioned at the bottom $(X_0, Y_0)$ of the injection hole 2 at the start of the electrophoresis is electrophoresed to the coordinates $(X_1, Y_C)$ in the recovery hole 3.

In the present embodiment, the recovery hole 3 is formed deeper than the injection hole 2 such that the X coordinate $X_C$ of the bottom of the recovery hole 3 satisfies the following Expression (1).

[Expression 1]

$$X_C > X_1 \tag{1}$$

As illustrated in FIG. 3, the X coordinate $X_1$ in the recovery hole 3 at which the biological substance is electrophoresed is smaller than the X coordinate $X_C$ of the bottom of the recovery hole 3 by forming the recovery hole 3 to be deeper than the injection hole 2. Thus, the above Expression (1) can be satisfied. A difference $(X_C - X_0)$ in depths between the injection hole 2 and the recovery hole 3 is not limited, and can be appropriately changed depending on conditions such as a distance $(Y_C - Y_0)$ between the injection hole 2 and the recovery hole 3 in the Y-axis direction and a mass of the biological substance. This difference is preferably 0.25 mm or more, for example.

Next, as illustrated in FIG. 3, a relationship between the coordinates $(X_0, Y_0)$ of the bottom of the injection hole 2, the coordinates $(X_C, Y_C)$ of the bottom of the recovery hole 3, a slope a of the electric field when the electric field is applied in parallel with a straight line $X=aY$ will be described. In the present embodiment, the coordinates $(X_C, Y_C)$ of the bottom of the recovery hole 3 are set such that the relationship between the coordinates $(X_0, Y_0)$ of the bottom of the injection hole 2, the coordinates $(X_C, Y_C)$ of the bottom of the recovery hole 3, and the slope a of the electric field satisfies the following Expression (2).

[Expression 2]

$$X_C > aY_C - aY_0 + X_0 \tag{2}$$

Here, when the electric field is represented by a vector E, assuming that where a unit vector in the positive direction of the X-axis is $e_X$, a unit vector in the positive direction of the Y-axis is $e_Y$, a unit vector in the positive direction of the Z-axis is $e_Z$, a coefficient in the X-axial direction is B, a coefficient in the Y-axis direction is C, and a coefficient in the Z-axis direction is D, the vector E is represented by the following Expression (3). The coefficients B, C, and D are values determined by a strength and a sign of the electric field in the X-axis direction, the Y-axis direction, and the Z-axis direction.

[Expression 3]

$$\vec{E} = B\vec{e_X} + C\vec{e_Y} + D\vec{e_Z} \tag{3}$$

Under this assumption, the slope a of the electric field in the XY plane is represented by the following Expression (4). Since the electric field is directed from the positive electrode 10 to the negative electrode 11 (is directed to the negative direction of the Y-axis), the coefficient C is a negative value. The coefficient B is a positive value when the electric field is applied downward, and is a negative value when the electric field is applied upward. Accordingly, when the electric field is applied downward, the slope a of the electric field in the XY plane is a negative value.

[Expression 6]

$$a = \frac{B}{C} \quad (4)$$

(When Slope of Electric Field is a=0)

As illustrated in FIG. 3, when the slope of the electric field is a=0 and the electric field is applied in parallel with the Y-axis, an expression in which a=0 is substituted into the above Expression (2) is $X_C > X_0$. That is, $X_C > X_0$ can be satisfied by setting the bottom $(X_C, Y_C)$ of the recovery hole 3 to be deeper than the bottom $(X_0, Y_0)$ of the injection hole 2.

(When Slope of the Electric Field is a<0)

When the above Expression (2) is modified, the following Expression (5) is obtained. Here, in the following Expression (5), since $Y_C-Y_0$ on a right side indicates the distance between the injection hole 2 and the recovery hole 3 in the Y-axis direction, the right side is a positive value. Thus, when the slope of the electric field is a<0, the right side of the following Expression (5) has a negative value. Accordingly, even when the slope of the electric field is a<0, a left side $(X_C-X_0)$ of the following Expression (5), that is, the difference $(X_C-X_0)$ in depths between the injection hole 2 and the recovery hole 3 is a positive value by setting the bottom $(X_C, Y_C)$ of the recovery hole 3 to be deeper than the bottom $(X_0, Y_0)$ of the injection hole 2. Thus, the above Expression (2) and the following Expression (5) can be satisfied.

[Expression 5]

$$X_C - X_0 > a(Y_C - Y_0) \quad (5)$$

(When Slope of Electric Field is a>0)

When the slope of the electric field is a>0, the right side of the above Expression (5) is a positive value. Accordingly, the above Expression (2) and the above Expression (5) can be satisfied by setting the bottom $(X_C, Y_C)$ of the recovery hole 3 to be deeper than the bottom $(X_0, Y_0)$ of the injection hole 2 such that the difference $(X_C-X_0)$ in depths between the injection hole 2 and the recovery hole 3 is larger than a product $(a(Y_C-Y_0))$ of the slope a of the electric field and the distance $(Y_C-Y_0)$ between the injection hole 2 and the recovery hole 3 in the Y-axis direction.

As described above, in the first embodiment, the biological substance positioned at the bottom $(X_0, Y_0)$ of the injection hole 2 at the start of the electrophoresis is electrophoresed above the bottom $(X_C, Y_C)$ of the recovery hole 3 by setting the recovery hole to be deeper than the injection hole 2. Accordingly, the biological substances can be recovered with high recovery efficiency.

Next, an electrophoresis system according to a related art will be described with reference to FIGS. 4, 5A, and 5B. The electrophoresis system according to the related art includes an electrophoresis apparatus 100 and an electrophoresis gel 5. Since the configurations of the electrophoresis apparatus 100 and the electrophoresis gel 5 according to the related art are the same as those of the electrophoresis apparatus 100 and the electrophoresis gel 1 according to the first embodiment, the description thereof will be omitted.

Figure 4:
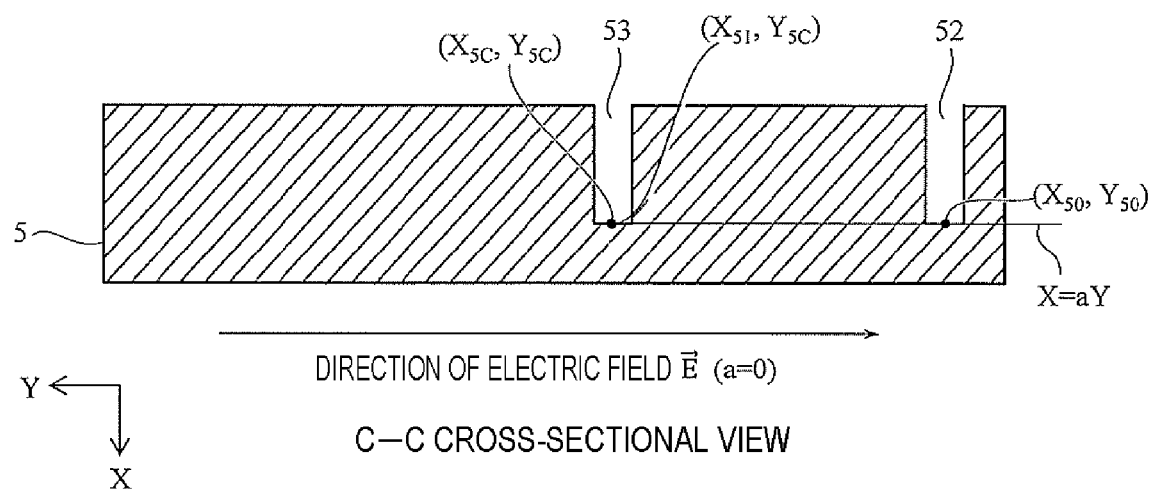
FIG. 4 is a cross-sectional view of an electrophoresis gel 5 according to a related art taken along the line C-C of FIG. 2.

FIG. 4 is a C-C cross-sectional view of the electrophoresis gel 5 according to the related art. As illustrated in FIG. 4, in the electrophoresis system according to the related art, the electrophoresis gel 5 has an injection hole 52 and a recovery hole 53 having the same depth, and the electric field is applied in parallel with the negative direction of the Y-axis.

Similar to the first embodiment, coordinates of the biological substance having the largest X coordinate among the biological substances present in the injection hole 52 at the start of the electrophoresis, that is, coordinates of the bottom of the injection hole 52 are $(X_{50}, Y_{50})$. Coordinates of the bottom of the recovery hole 53 are $(X_{5C}, Y_{5C})$. The coordinates $(X_{5C}, Y_{5C})$ of the bottom of the recovery hole 53 are, for example, a center of the bottom of the recovery hole 53 in the YZ plane. The coordinates $(X_{50}, Y_{50})$ of the bottom of the injection hole 52 are, for example, a center of the bottom of the injection hole 52 in the YZ plane.

In the electrophoresis system according to the related art, as illustrated in FIG. 4, when the biological substance positioned at the bottom $(X_{50}, Y_{50})$ of the injection hole 2 at the start of the electrophoresis receives the electric field and is electrophoresed up to the Y coordinate $Y=T_{5c}$ of the recovery hole 53, it can be assumed that a position (X coordinate) of the biological substance in the vertical direction is $X=X_{51}$ $(X_{51}=X_{50})$ from the direction of the electric field. That is, it can be assumed that the biological substance positioned at the bottom $(X_{50}, Y_{50})$ of the injection hole 52 at the start of the electrophoresis is electrophoresed to the bottom $(X_{51}, Y_{5C})$ of the recovery hole 53.

However, in reality, since the biological substances also move in a direction other than the direction of the electric field due to diffusion caused by Brownian motion and movement caused by gravity in addition to the movement caused by the electric field, it is considered that some biological substances pass under the recovery hole 53 and do not enter the recovery hole 53.

Figure 5A:
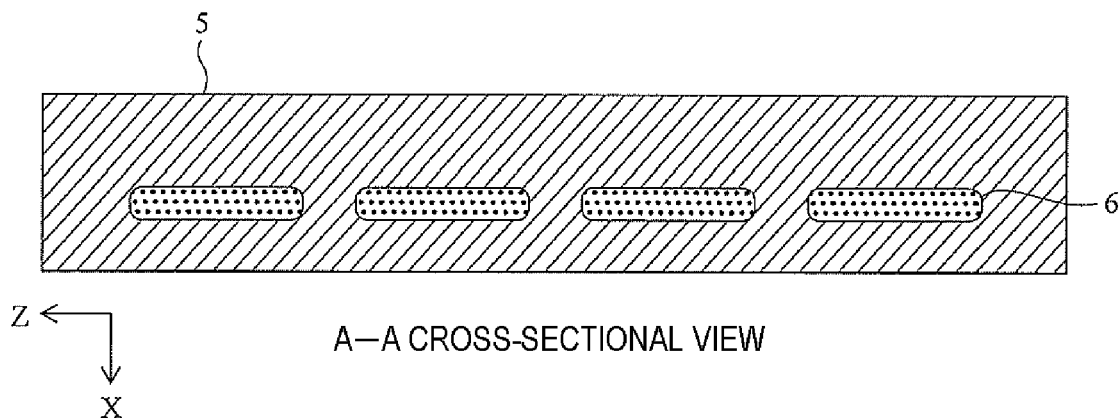
FIG. 5A is a cross-sectional view of the electrophoresis gel 5 according to the related art taken along a line A-A of FIG. 2.
Figure 5B:
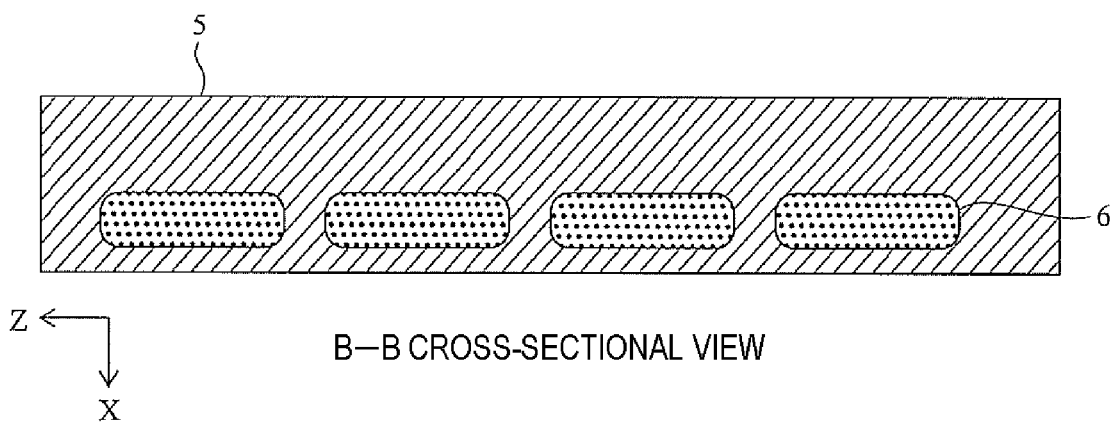
FIG. 5B is a cross-sectional view of the electrophoresis gel 5 according to the related art taken along a line B-B of FIG. 2.

FIG. 5A is an A-A cross-sectional view of the electrophoresis gel 5 according to the related art. FIG. 5B is a B-B cross-sectional view of the electrophoresis gel 5 according to the related art. FIGS. 5A and 5B illustrate cross-sectional views when the electrophoresis gel 5 is cut during the electrophoresis of the biological substance 6. A distribution of the biological substances 6 can be confirmed by staining the biological substances 6. As illustrated in FIGS. 5A and 5B, the biological substances 6 diffuse in the vertical and horizontal directions as an electrophoresis distance increases.

Thus, the biological substance positioned at the bottom $(X_0, Y_0)$ of the injection hole 2 at the start of the electrophoresis is electrophoresed above the bottom of the recovery hole 3 by setting the recovery hole 3 to be deeper than the injection hole 2 as in the first embodiment. When the influence of Brownian motion and gravity on the biological substance is considered, as described above, the recovery hole 3 is formed deeper than the injection hole 2 depending on the conditions such as the distance $(Y_C-Y_0)$ between the injection hole 2 and the recovery hole 3 in the Y-axis direction and the mass of the biological substance. With such a configuration, according to the present embodiment, the biological substances can be recovered from the electrophoresis gel with high recovery efficiency.

Second Embodiment

Figure 6:
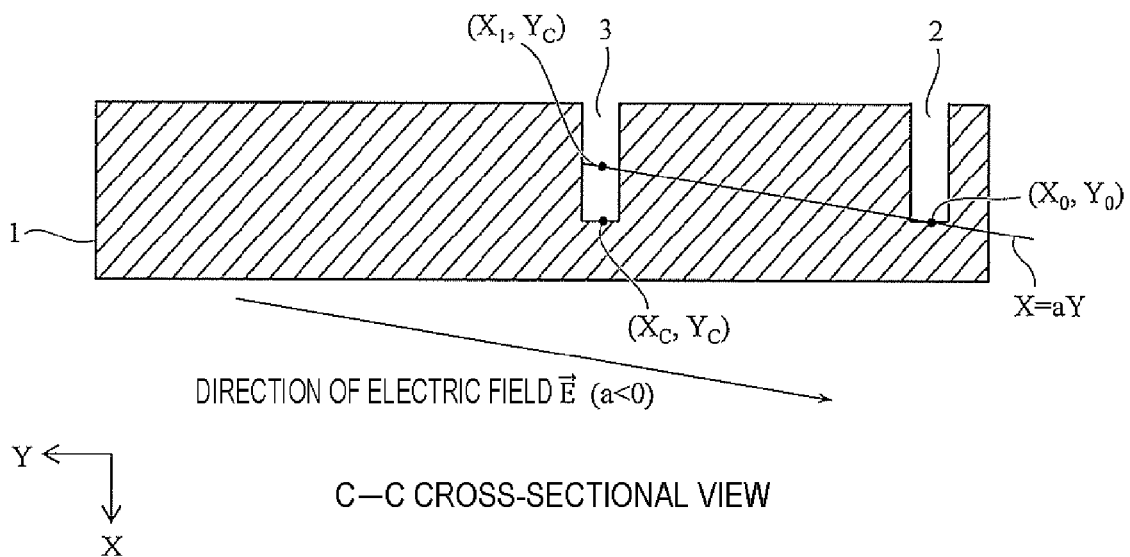
FIG. 6 is a cross-sectional view of an electrophoresis gel 1 according to a second embodiment taken along the line C-C of FIG. 2.

Next, an electrophoresis system and an electrophoresis method according to a second embodiment will be described with reference to FIG. 6. FIG. 6 is a C-C cross-sectional view of the electrophoresis gel 1 according to the second embodiment.

The electrophoresis system according to the present embodiment is different from the first embodiment in that the depths of the injection hole 2 and the recovery hole 3 of the electrophoresis gel 1 are equal and an electric field parallel to X=aY (a<0) is applied as illustrated in FIG. 6. That is, in the electrophoresis method according to the present embodiment, the step of applying the electric field is a step of applying the electric field having a slope in the negative direction of the X-axis. Since the settings of the X-axis, the Y-axis, and the coordinates are the same as those in the first embodiment, the description thereof will be omitted.

As illustrated in FIG. 6, in a case where the depths of the injection hole 2 and the recovery hole 3 are equal ($X_0=X_C$) and the electric field is tilted in the negative direction in the X-axis direction (a<0), when the biological substance positioned at the bottom ($X_0$, $Y_0$) of the injection hole 2 at the start of the electrophoresis receives the electric field and is electrophoresed up to the Y coordinate $Y=Y_C$ of the recovery hole 3, it can be assumed that a position (X coordinate) of the biological substance in the vertical direction is X=X1 ($X_1<X_0$) from the direction of the electric field. As stated above, since the X coordinate $X_1$ in the recovery hole 3 at which the biological substance is electrophoresed is smaller than the X coordinate $X_C$ of the bottom of the recovery hole 3 by applying the electric field having the slope in the negative direction of the X-axis, the above Expression (1) can be satisfied. The slope a of the electric field can be appropriately changed depending on the distance ($Y_C-Y_0$) between the injection hole 2 and the recovery hole 3 in the Y-axis direction, the mass of the biological substance, and the like. For example, the slope a of the electric field is preferably set such that the difference between the X coordinate $X_1$ in the recovery hole 3 of the biological substance electrophoresed from the bottom ($X_0$, $Y_0$) of the injection hole 2 and the X coordinate $X_0$ of the bottom of the injection hole 2 is 0.25 mm or more. In this case, an upper limit of the slope a of the electric field is determined within a range satisfying Expression (1).

Next, a relationship between the coordinates ($X_0$, $Y_0$) of the bottom of the injection hole 2, the coordinates ($X_C$, $Y_C$) of the bottom of the recovery hole 3, and the slope a of the electric field when the electric field is applied in parallel with the straight line X=aY will be described. In the present embodiment, the slope a of the electric field is set such that the relationship between the coordinates ($X_0$, $Y_0$) of the bottom of the injection hole 2, the coordinates ($X_C$, $Y_C$) of the bottom of the recovery hole 3, and the slope a of the electric field satisfies the above Expression (2) and the above Expression (5).

As illustrated in FIG. 6, when the depths of the injection hole 2 and the recovery hole 3 are equal, $X_C=X_0$. An expression in which $X_C=X_0$ is substituted into the above Expression (5) is 0>a ($Y_C-Y_0$). Since $Y_C-Y_0$ on the right side indicates the distance between the injection hole 2 and the recovery hole 3 in the Y-axis direction, the right side is a positive value. Thus, the above Expression (2) and the above Expression (5) can be satisfied by applying the electric field having the negative slope a. The slope a of the electric field can be appropriately changed depending on the distance ($Y_C-Y_0$) between the injection hole 2 and the recovery hole 3 in the Y-axis direction, the mass of the biological substance, and the like.

In the second embodiment, instead of tilting the electric field, the electrophoresis gel 1 may be tilted and installed in the electrophoresis tank 9 so as to be equal to the slope a of the electric field, and the electric field may be applied in parallel with the Y-axis.

As described above, the second embodiment has a configuration in which the electric field to be applied to the electrophoresis gel 1 is parallel to X=aY (a<0) or the electrophoresis gel 1 is tilted by the slope a. When the influence of Brownian motion and gravity on the biological substance is considered, as described above, the slope a of the electric field is set, or the electrophoresis gel 1 is tilted by the slope a depending on the conditions such as the distance ($Y_C-Y_0$) between the injection hole 2 and the recovery hole 3 in the Y-axis direction and the mass of the biological substance. In the present embodiment, with such a configuration, the biological substance positioned at the bottom ($X_0$, $Y_0$) of the injection hole 2 at the start of the electrophoresis is electrophoresed above the bottom ($X_C$, $Y_C$) of the recovery hole 3. Therefore, the biological substances can be recovered from the electrophoresis gel with high recovery efficiency.

Third Embodiment

Figure 7:
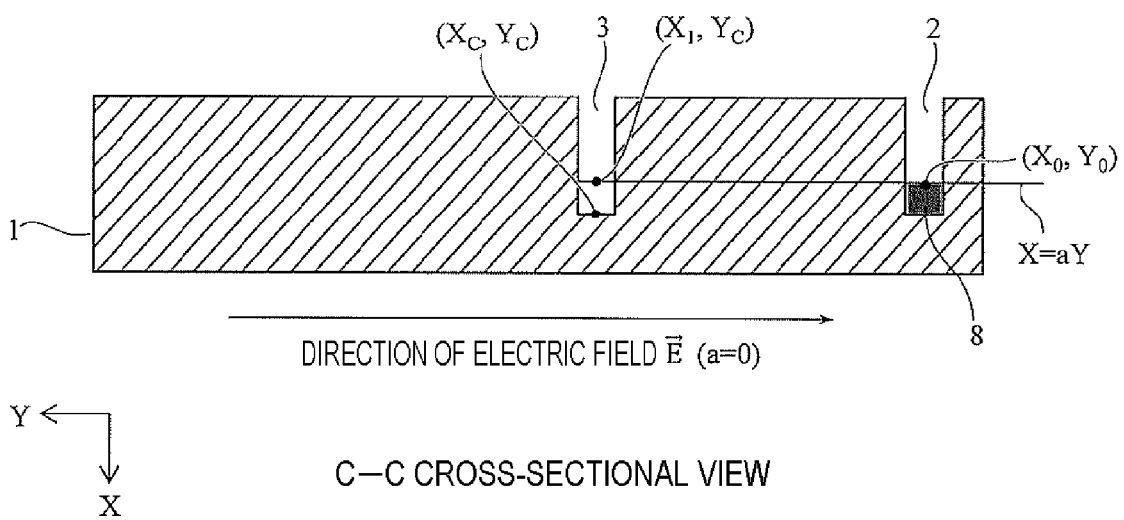
FIG. 7 is a cross-sectional view of an electrophoresis gel 1 according to a third embodiment taken along the line C-C of FIG. 2.

Next, an electrophoresis system and an electrophoresis method according to a third embodiment will be described with reference to FIG. 7. FIG. 7 is a C-C cross-sectional view of the electrophoresis gel 1 according to the third embodiment.

The electrophoresis system according to the present embodiment is different from the first embodiment in that the depths of the injection hole 2 and the recovery hole 3 of the electrophoresis gel 1 are equal and a liquid 8 having a specific gravity higher than those of the buffer solution 4 and the injection solution is injected to the injection hole 2 as illustrated in FIG. 7. That is, the electrophoresis method according to the present embodiment includes a step of injecting the liquid 8 having the specific gravity higher than that of the biological substance into the injection hole 2 before the step of injecting, by the user, the biological substance into the injection hole 2 of the electrophoresis gel 1.

Examples of the liquid 8 include glycerol and aqueous solution of sugar having concentrations higher than that of the injection solution containing the biological substances. When the liquid 8 is glycerol, the concentration thereof is not limited, but can be, for example, 90% to 95%. A viscosity of the liquid 8 can be, for example, 500 to 1000 mPa·s when the liquid 8 is glycerol.

Since the settings of the X-axis and the Y-axis are the same as those in the first embodiment, the description thereof will be omitted. In the present embodiment, among the biological substances present in the injection hole 2 at the start of the electrophoresis, the coordinates of the biological substance having the largest X coordinate, that is, a top surface of the liquid 8 is used as the origin, and these coordinates are ($X_0$, $Y_0$). Other coordinates are set similar to the first embodiment. For example, the coordinates ($X_0$, $Y_0$) of the top surface of the liquid 8 can be a center of the top surface of the liquid 8.

As illustrated in FIG. 7, when the biological substance positioned on the top surface ($X_0$, $Y_0$) of the liquid 8 at the start of the electrophoresis receives the electric field and is electrophoresed up to the Y coordinate $Y=Y_C$ of the recovery hole 3, it can be assumed that the position (X coordinate) in the vertical direction is $X=X_1 (X_1=X_0)$ from the direction of the electric field. Accordingly, the X coordinate $X_1$ of the biological substance in the recovery hole 3 is smaller than the X coordinate $X_C$ of the bottom of the recovery hole 3 by injecting the liquid 8 into the injection hole 2 and setting the injection hole 2 to be shallower than the recovery hole 3. Thus, the above Expression (1) can be satisfied. A difference between a height of the top surface of the liquid 8 and a height of the bottom of the recovery hole 3 is not limited, and can be appropriately changed depending on the conditions such as the distance $(Y_C-Y_0)$ between the injection hole 2 and the recovery hole 3 in the Y-axis direction and the mass of the biological substance. This difference is preferably 0.25 mm or more, for example. In this case, an upper limit of the amount of injection of the liquid 8 is determined within a range in which the injection solution does not overflow from the injection hole 2.

Next, a relationship between the coordinates $(X_0, Y_0)$ of the bottom of the injection hole 2, the coordinates $(X_C, Y_C)$ of the bottom of the recovery hole 3, and the slope a of the electric field when the electric field is applied in parallel with the straight line X=aY will be described. In the present embodiment, the amount of injection of the liquid 8 is set such that the relationship between the coordinates $(X_0, Y_0)$ of the bottom of the injection hole 2, the coordinates $(X_C, Y_C)$ of the bottom of the recovery hole 3, and the slope a of the electric field satisfies the above Expression (2).

(When Slope of Electric Field is a=0)

As illustrated in FIG. 7, when the slope of the electric field is a=0 and the electric field is applied in parallel with the Y-axis, an expression in which a=0 is substituted in the above Expression (2) is $X_C>X_0$. That is, $X_C>X_0$ can be satisfied by injecting the liquid 8 such that the top surface $(X_0, Y_0)$ of the liquid 8 is shallower than the bottom $(X_C, Y_C)$ of the recovery hole 3.

(When Slope of the Electric Field is a<0)

As described above, when the above Expression (2) is modified, the above Expression (5) is obtained. Here, in the above Expression (5), $Y_C-Y_0$ is a positive value because $Y_C-Y_0$ indicates the distance between the injection hole 2 and the recovery hole 3 in the Y-axis direction. When the slope of the electric field is a<0, the right side of the above Expression (5) is a negative value. Accordingly, the left side $(X_C-X_0)$ of the above Expression (5) is a positive value by injecting the liquid 8 such that the top surface $(X_0, Y_0)$ of the liquid 8 is shallower than the bottom $(X_C, Y_C)$ of the recovery hole 3. Thus, the above Expression (2) and the above Expression (5) can be satisfied.

(When Slope of Electric Field is a>0)

When the slope of the electric field is a>0, the right side of the above Expression (5) is a positive value. Accordingly, the difference $(X_C-X_0)$ in depths between the injection hole 2 and the recovery hole 3 is larger than the product $(a(Y_C-Y_0))$ of the slope a of the electric field and the distance $(Y_C-Y_0)$ between the injection hole 2 and the recovery hole 3 in the Y-axis direction. That is, $X_C-X_0$ is a positive value by injecting the liquid 8 such that the top surface $(X_0, Y_0)$ of the liquid 8 is shallower than the bottom $(X_C, Y_C)$ of the recovery hole 3, and thus, the above Expression (2) and the above Expression (5) can be satisfied.

As described above, the third embodiment has a configuration in which the liquid 8 is injected into the injection hole 2. When the influence of Brownian motion and gravity on the biological substance is considered, as described above, the amount of injection of liquid 8 is set depending on the conditions such as the distance $(Y_C-Y_0)$ between the injection hole 2 and the recovery hole 3 in the Y-axis direction and the mass of the biological substance. In the present embodiment, with such a configuration, the biological substance positioned at the bottom $(X_0, Y_0)$ of the injection hole 2 at the start of the electrophoresis is electrophoresed above the bottom $(X_C, Y_C)$ of the recovery hole 3. Therefore, the biological substances can be recovered from the electrophoresis gel with high recovery efficiency.

The present invention is not limited to the aforementioned embodiments, and includes various modification examples. For example, the aforementioned embodiments are described in detail in order to facilitate easy understanding of the present invention, and are not limited to necessarily include all the described components. Some of the components of a certain embodiment can be substituted into the components of another embodiment, and the components of another embodiment can be added to the component of a certain embodiment. In addition, other components can be added, removed, and substituted to, from, and into some of the components of the aforementioned embodiment.

EXAMPLES

Example 1

An example of the first embodiment will be described.

(Preparation of Electrophoresis Gel)

An agarose gel having the injection hole 2 and the recovery hole 3 was prepared. The agarose gel was molded by pouring 3% SeaKem (registered trademark) GTG-TAE (manufactured by Lonza) into a plastic container such that a length (thickness) in the X-axis direction was 5 mm, a length in the Y-axis direction was 60 mm, and a length in the Z-axis direction was 55 mm. The agarose gel was molded by inserting a comb before the agarose gel was solidified such that the injection hole 2 had a dimension of 1 mm×5 mm in the YZ plane and a depth of 3 mm in the X-axis direction and the recovery hole 3 had a dimension of 1 mm×5 mm in the YZ plane and a depth of 4 mm in the X-axis direction. The distance between the injection hole 2 and the recovery hole 3 in the Y-axis direction was 20 mm.

(Electrophoresis)

The prepared agarose gel was horizontally arranged in an electrophoresis apparatus (Mupid (registered trademark), manufactured by Mupid), and 1×TAE buffer solution (Tris Acetate EDTA Buffer) was poured into the electrophoresis tank 9 and filled up to an approximately top surface of the agarose gel. The insides of the injection hole 2 and the recovery hole 3 were also filled with the TAE buffer solution. Thereafter, an injection solution was prepared by mixing 1 μL of 6×DNA Loading Dye (manufactured by Thermo Fisher Scientific) with 5 μL of a sample solution containing nucleic acids having various lengths, and was injected into the injection hole 2.

After injecting the injection solution, a voltage of 50 V was applied such that the electric field acted linearly in parallel with the Y-axis, and electrophoresis was performed for 30 minutes. The nucleic acids electrophoresed within the recovery hole 3 were recovered together with the TAE buffer solution every five minutes immediately after the start of the electrophoresis. The TAE buffer solution was injected into the recovery hole 3 whenever the nucleic acids were recovered.

(Measurement of Recovery Efficiency)

Figure 8:
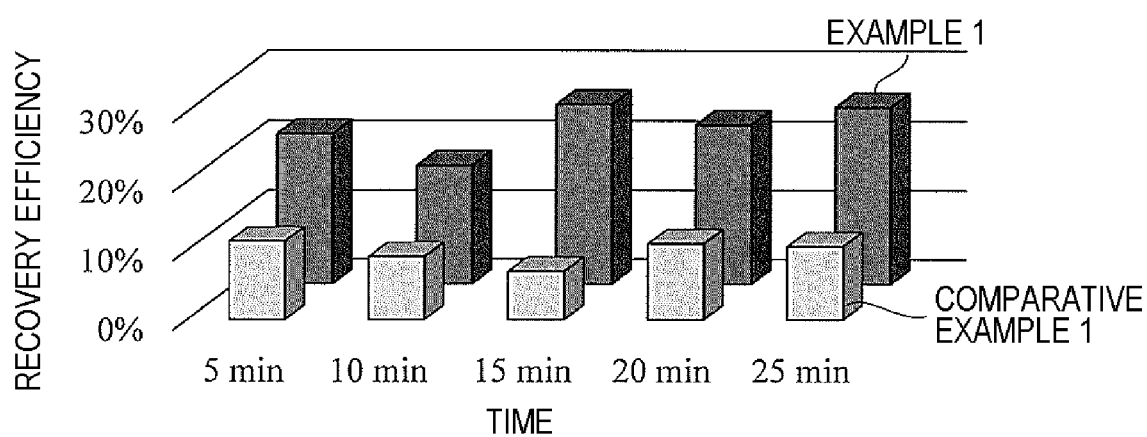
FIG. 8 is a graph showing recovery efficiency of nucleic acids in Example 1 and Comparative Example 1.

A length and a mass of the nucleic acids contained in the recovered solution recovered every 5 minutes were quantified by using TapeStation (manufactured by Agilent Technologies), and the recovery efficiency was calculated. The result is illustrated in FIG. 8.

Comparative Example 1

Electrophoresis was performed similar to Example 1 except that the depth of the recovery hole 3 in the X-axis direction was set to 3 mm and the depths of the injection hole 2 and the recovery hole 3 were set to be equal. Then, the recovery efficiency of the nucleic acids according to Comparative Example 1 was calculated. The result is illustrated in FIG. 8.

(Measurement Result)

FIG. 8 is a graph showing the recovery efficiencies of the nucleic acids in Example 1 and Comparative Example 1. As shown in FIG. 8, it can be seen that the recovery efficiency in Example 1 using the agarose gel in which the depth of the recovery hole 3 was larger than the depth of the injection hole 2 was two times or more that in Comparative Example 1 using the agarose gel in which the depths of the injection hole 2 and the recovery hole 3 were equal.

Example 2

An example of the second embodiment will be described.

(Preparation of Electrophoresis Gel)

An agarose gel was prepared similar to Example 1 except that the depths of the injection hole 2 and the recovery hole 3 in the X-axis direction were both 4 mm.

(Electrophoresis)

Electrophoresis was performed similar to Example 1 except that the prepared agarose gel was installed in an inclined manner such that an end thereof on the negative electrode 11 side was 3 mm higher than an end thereof on the positive electrode 10 side, and electrophoresis was performed such that the electric field acts linearly in parallel with the Y-axis. Then, the nucleic acids electrophoresed within the recovery hole 3 were recovered together with the TAE buffer solution every five minutes immediately after the start of the electrophoresis.

(Measurement of Recovery Efficiency)

Similar to Example 1, the length and mass of the nucleic acids contained in the recovered solution recovered every 5 minutes were quantified, and the recovery efficiency was calculated.

(Measurement Result)

Although not illustrated, it can be seen that the recovery efficiency in Example 2 in which the electrophoresis gel was arranged such that the height of the end on the negative electrode 11 side in the X-axis direction was 3 mm higher than the height of the end on the positive electrode 10 side in the X-axis direction was two times or more that in Comparative Example 1 in which the same electrophoresis gel was horizontally arranged.

Example 3

An example of the third embodiment will be described.

(Preparation of Electrophoresis Gel)

An agarose gel was prepared similar to Example 1 except that the depths of the injection hole 2 and the recovery hole 3 in the X-axis direction were both 4 mm.

(Electrophoresis)

The prepared agarose gel was horizontally arranged in an electrophoresis apparatus (Mupid (registered trademark), manufactured by Mupid), and 1×TAE buffer solution (Tris Acetate EDTA Buffer) was poured into the electrophoresis tank 9 and filled up to an approximately top surface of the agarose gel. The insides of the injection hole 2 and the recovery hole 3 were also filled with the TAE buffer solution. Thereafter, 5 µL of 90% glycerol was injected into the injection hole 2. Electrophoresis was performed by other operations similar to Example 1 such that the electric field acted in parallel with the Y-axis. Then, the nucleic acids electrophoresed within the recovery hole 3 were recovered together with the TAE buffer solution every five minutes immediately after the start of electrophoresis.

(Measurement of Recovery Efficiency)

Similar to Example 1, the length and the mass of the nucleic acids contained in the recovered solution recovered every 5 minutes were quantified, and the recovery efficiency was calculated.

(Measurement Result)

Although not illustrated, it can be seen that the recovery efficiency in Example 3 in which 90% glycerol having a specific gravity higher than that of the injection solution was injected into the injection hole 2 was two times or more that in Comparative Example 1 in which 90% glycerol was not injected.

REFERENCE SIGNS LIST 1,5 electrophoresis gel
2,52 injection hole
3,53 recovery hole
4 buffer solution
6 biological substance
8 liquid
9 electrophoresis tank
10 positive electrode
11 negative electrode
12 voltage controller
100 electrophoresis apparatus

The invention claimed is:

1. An electrophoresis method using an electrophoresis gel that has an injection hole into which biological substances are injected and a recovery hole from which the biological substances are recovered, the electrophoresis method comprising:

injecting a liquid having a specific gravity higher than a specific gravity of the biological substances into the injection hole;

after injecting the liquid, injecting the biological substances into the injection hole; and applying an electric field penetrating the injection hole and the recovery hole, wherein an axis having a vertical downward direction as a positive direction is set as an X-axis, an axis which is parallel to a plane passing through any points of the injection hole and the recovery hole and is perpendicular to the X-axis is set as a Y-axis, and coordinates of a bottom of the recovery hole are set as $(X_c, Y_c)$, and the X coordinate $X_c$ of the bottom of the recovery hole satisfies the following Expression (1) when the biological substances are electrophoresed to coordinates $(X_1, Y_c)$ in the recovery hole from a bottom of the injection hole in the applying the electric field

[Expression 1]

$$X_C > X_1 \qquad (1).$$

2. The electrophoresis method according to claim 1, wherein the applying the electric field is applying the electric field parallel to a straight line X=aY, and a relationship between coordinates $(X_0, Y_0)$ of the biological substances having the largest X coordinate in the injection hole at the start of the applying the electric field, the coordinates (Xc, Yc) of the bottom of the recovery hole, and a slope "a" of the electric field satisfies the following Expression (2)

[Expression 2]

$$X_C > aY_C - aY_0 + X_0 \quad (2).$$

3. The electrophoresis method according to claim 1, wherein the recovery hole is deeper than the injection hole.

4. The electrophoresis method according to claim 1, wherein the applying the electric field is applying the electric field in parallel with a straight line X=aY, wherein a slope of the electric field is negative.

\* \* \* \* \*